(12) United States Patent
Cooper et al.

(10) Patent No.: US 10,427,970 B1
(45) Date of Patent: Oct. 1, 2019

(54) GLASS COATINGS AND METHODS TO DEPOSIT SAME

(71) Applicant: Owens-Brockway Glass Container Inc., Perrysburg, OH (US)

(72) Inventors: Scott Cooper, Maumee, OH (US); Varun Mukheja, Toledo, OH (US); Tilak Gullinkala, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 219 days.

(21) Appl. No.: 15/284,286

(22) Filed: Oct. 3, 2016

(51) Int. Cl.
*C03B 19/01* (2006.01)
*C03C 3/076* (2006.01)
*C03C 1/00* (2006.01)
*C03C 3/108* (2006.01)
*C03B 19/02* (2006.01)

(52) U.S. Cl.
CPC .............. *C03C 1/006* (2013.01); *C03B 19/02* (2013.01); *C03C 3/108* (2013.01)

(58) Field of Classification Search
CPC ......... C03B 19/01; C03B 19/00; C03B 19/09; C03B 19/12; C03B 37/01291; C03B 37/01277; C03B 37/0128; C03C 3/078; C03C 3/083; C03C 3/085; C03C 3/089; C03C 3/091; C03C 3/097; C03C 3/105; C03C 3/108
See application file for complete search history.

(56) References Cited

U.S. PATENT DOCUMENTS

| 500,933 | A | | 7/1893 | McLaughlin |
| 2,204,113 | A | | 6/1940 | Allen |
| 2,976,161 | A | | 3/1961 | Smith |
| 3,081,180 | A | | 3/1963 | Krinov |
| 3,268,350 | A | | 8/1966 | Grebe et al. |
| 3,542,534 | A | | 11/1970 | Yamamoto |
| 3,640,093 | A | * | 2/1972 | Levene .................. C03C 1/006 |
| | | | | 106/445 |
| 3,753,743 | A | | 8/1973 | Kakuda et al. |

(Continued)

FOREIGN PATENT DOCUMENTS

| CN | 1566001 A | 1/2005 |
| CN | 201856031 U | 6/2011 |

(Continued)

OTHER PUBLICATIONS

International Search Report and Written Opinion, Int. Application No. PCT/US2016/024001, Int. Filing Date: Mar. 24, 2016, Applicant: Owens-Brockway Glass Container Inc., dated Jun. 23, 2016.

(Continued)

*Primary Examiner* — Jason L Lazorcik

(57) ABSTRACT

A dried glass precursor gel and methods of depositing a powderized or wire form of the dried glass precursor gel to form a glass substrate and/or coating are disclosed. The dried glass precursor gel contains a bulk amorphous oxide-based matrix of primary constituent oxides. One method includes obtaining the dried glass precursor gel, forming a powder or wire from the dried glass precursor gel, melting the powder with a gas stream to form molten droplets, and depositing the molten droplets onto a mold or similar target substrate.

18 Claims, 6 Drawing Sheets

(56) References Cited

U.S. PATENT DOCUMENTS

| | | | |
|---|---|---|---|
| 3,759,683 A * | 9/1973 | Dislich et al. | C03C 1/00 501/7 |
| 3,767,434 A * | 10/1973 | Thomas | C03C 1/006 501/12 |
| 3,793,039 A | 2/1974 | Rostoker | |
| 3,799,754 A | 3/1974 | Thomas | |
| 3,933,514 A | 1/1976 | Banks et al. | |
| 3,954,431 A * | 5/1976 | Fleming, Jr. | C03B 19/01 501/65 |
| 3,967,943 A | 7/1976 | Seeley | |
| 3,969,100 A | 7/1976 | Kuna et al. | |
| 4,023,976 A | 5/1977 | Bauer et al. | |
| 4,028,085 A * | 6/1977 | Thomas | C03C 3/04 501/12 |
| 4,030,938 A * | 6/1977 | Thomas | C03C 3/04 423/277 |
| 4,031,175 A | 6/1977 | Cooper et al. | |
| 4,172,161 A | 10/1979 | Feldmann et al. | |
| 4,200,445 A * | 4/1980 | Bihuniak | C01B 33/26 423/332 |
| 4,211,568 A | 7/1980 | Davis | |
| 4,219,361 A | 8/1980 | Sutton et al. | |
| 4,273,568 A | 6/1981 | Scholl et al. | |
| 4,283,427 A | 8/1981 | Winters | |
| 4,430,107 A | 2/1984 | Dennert et al. | |
| 4,514,329 A | 4/1985 | Wakabayashi et al. | |
| 4,607,015 A | 8/1986 | Clough et al. | |
| 4,661,299 A | 4/1987 | Thorsrud | |
| 4,767,429 A * | 8/1988 | Fleming | C03B 19/01 423/331 |
| 4,806,718 A | 2/1989 | Seaborne | |
| 4,808,780 A | 2/1989 | Seaborne | |
| 4,810,845 A | 3/1989 | Seaborne | |
| 4,842,630 A | 6/1989 | Braithwaite et al. | |
| 4,851,150 A | 7/1989 | Hench et al. | |
| 4,857,289 A | 8/1989 | Nauroth et al. | |
| 5,000,933 A | 3/1991 | Novotny et al. | |
| 5,084,262 A | 1/1992 | Novotny et al. | |
| 5,196,382 A | 3/1993 | Hench et al. | |
| 5,206,189 A * | 4/1993 | Caldwell | C03C 1/006 423/332 |
| 5,310,594 A | 5/1994 | Holland et al. | |
| 5,686,031 A | 11/1997 | Coronado et al. | |
| 5,989,372 A * | 11/1999 | Momoda | H01L 21/4803 156/273.1 |
| 6,331,330 B1 * | 12/2001 | Choy | B05D 1/04 427/314 |
| 6,360,564 B1 * | 3/2002 | Cornelius | C03B 19/1065 423/338 |
| 6,408,649 B1 | 6/2002 | Sklyarevich et al. | |
| 6,497,945 B1 | 12/2002 | Niedner et al. | |
| 6,568,215 B2 | 5/2003 | Schofield et al. | |
| 6,797,658 B2 | 9/2004 | Pecoraro et al. | |
| 6,878,652 B2 | 4/2005 | Pecoraro et al. | |
| 6,902,814 B2 | 6/2005 | Takahashi et al. | |
| 6,909,075 B2 | 6/2005 | Jakeset et al. | |
| 6,938,441 B1 | 9/2005 | Hajek | |
| 7,260,960 B2 | 8/2007 | Carty | |
| 7,297,909 B2 | 11/2007 | Smrcek et al. | |
| 8,361,621 B2 | 1/2013 | Cook | |
| 8,919,151 B2 | 12/2014 | Shinohara | |
| 8,936,850 B2 | 1/2015 | Wang | |
| 9,067,348 B2 | 6/2015 | Albrecht | |
| 9,272,946 B2 | 3/2016 | Chang et al. | |
| 9,321,675 B2 | 4/2016 | Jain | |
| 2004/0099010 A1 | 5/2004 | Johansson | |
| 2004/0148966 A1 * | 8/2004 | Celikkaya | B24D 3/00 65/17.4 |
| 2004/0161375 A1 * | 8/2004 | Katsuro | C03B 19/01 423/338 |
| 2006/0059709 A1 * | 3/2006 | Boara | C03B 19/12 34/413 |
| 2006/0081004 A1 | 4/2006 | Ishikawa et al. | |
| 2008/0190034 A1 * | 8/2008 | Rosenflanz | C03C 3/125 51/307 |
| 2009/0215606 A1 * | 8/2009 | Gini | C03B 19/12 501/12 |
| 2009/0293544 A1 | 12/2009 | Fregonese et al. | |
| 2011/0192321 A1 | 8/2011 | Bohlander et al. | |
| 2012/0074150 A1 | 3/2012 | Wortmann et al. | |
| 2012/0125052 A1 | 5/2012 | Dong | |
| 2012/0159994 A1 | 6/2012 | Sakamoto et al. | |
| 2012/0183773 A1 * | 7/2012 | An | C03C 1/006 428/402 |
| 2013/0239618 A1 | 9/2013 | Ishikawa et al. | |
| 2014/0345328 A1 | 11/2014 | Folgar | |
| 2015/0107301 A1 * | 4/2015 | Lehmann | C04B 35/185 65/21.3 |
| 2015/0329286 A1 | 11/2015 | Geib | |
| 2015/0360961 A1 | 12/2015 | Oikawa et al. | |
| 2016/0289114 A1 * | 10/2016 | Cooper | C03B 9/193 |

FOREIGN PATENT DOCUMENTS

| | | |
|---|---|---|
| CN | 102584018 A | 7/2012 |
| CN | 203128388 U | 8/2013 |
| CN | 103880268 A | 6/2014 |
| CZ | 291652 B | 4/2003 |
| CZ | 298244 B | 8/2007 |
| DE | 4013343 A1 | 5/1991 |
| DE | 102009053785 A1 | 5/2011 |
| EP | 0892586 A2 | 1/1999 |
| EP | 0826630 B1 | 5/2001 |
| EP | 1411032 A1 | 4/2004 |
| EP | 2647605 A1 | 9/2013 |
| GB | 2047678 A | 12/1980 |
| GB | 2181727 A | 4/1987 |
| IN | 00243KO2010 A | 11/2012 |
| JP | S5751133 A | 3/1982 |
| JP | 57145036 A | 9/1982 |
| JP | S58156542 A | 9/1983 |
| JP | 2001106552 A | 4/2001 |
| JP | 2005255443 A | 9/2005 |
| JP | 2006273621 A | 10/2006 |
| JP | 2007045704 A | 2/2007 |
| RU | 2133715 C1 | 7/1999 |
| RU | 2134244 C1 | 8/1999 |
| RU | 2134245 C1 | 8/1999 |
| WO | 91/19673 A1 | 6/1991 |
| WO | 2006043909 A1 | 4/2006 |
| WO | 2006059576 A1 | 6/2006 |
| WO | 2012012259 A1 | 1/2012 |
| WO | 2013154499 A1 | 10/2013 |

OTHER PUBLICATIONS

Kasgoz, Ahmet et al., "Sol-gel Preparation of Borosilicates," Journal of Non-Crystalline Solids, North-Holland Physics Publishing, Amsterdam, NL, vol. 243, No. 2-3, Feb. 1, 1999, pp. 168-174.

Saxena, V.K. et al., "Microwave Synthesis: A Physical Concept," Intech, 2011, pp. 3-22.

Kato, Yoshiyuki et al, "Dielectric Properties of Uranium and Plutonium Nitrate solution and the Oxide Compounds formed in the De-nitration process by the Microwave Heating Method," Journal of Nuclear Science and Technology, 2004, pp. 857-862.

Newnham et al., "Fundamental interaction mechanisms between microwaves and matter," Materials Research Laboratory, Pennsylvania State University, 1991, pp. 51-67.

Mandal, Ashis Kumar et al., "Microwave Preparation of SiO2—B2O3—Na2O—K2O—CaO—Fe2O3—TiO2 Glass System," J. Chem. Eng., 2014, pp. 349-357.

Mandal, Ashis Kumar et al., "Higher Fe2+/total Fe ratio in iron doped phosphate glass melted by microwave heating," Materials Research Bulletin, 2015, Abstract.

Mandal, Ashis Kumar et al., "Preparation of alumino-phosphate glass by microwave radiation," Journal of Materials Research, Jul. 2013, Abstract.

Mandal, Ashis Kumar et al., "Preparation of homogenous barium borosilicate glass using microwave energy," Journal of Non-Crystalline Solids, Jul. 2013, Abstract.

(56) References Cited

OTHER PUBLICATIONS

Sarkar et al., "Synthesis of Bioactive Glass by Microwave Energy Irradiation and Its In-Vitro Biocompatibility," Bioceramics Development and Applications, 2011, pp. 1-3.

Kharissova et al., "Review: The Use of Microwave Irradiation in the Processing of Glasses and Their Composites," Ind. Eng. Chem. Res., 2010, pp. 1457-1466.

Almeida et al., "Characterization of iron phosphate glasses prepared by microwave heating," Journal of Non-Crystalline Solids, 2007, Abstract.

Ghussn et al., "A novel method to produce niobium phosphate glasses by microwave heating," Energy and Nuclear Research Institute, 2004, Abstract.

Van Der Biest et al., "Microwave processing of sol-gel glasses and ceramics," Department of Metallurgy and Materials Engineering, Katholieke University Leuven, 1996, Abstract.

Knox, M. P. et al., "Use of microwave radiation for the processing of glass," Glass Technology, 1997, Abstract.

Potts et al., "Melting rate of soda-lime glasses as influenced by grain sizes of raw materials and additions of cullet," J. Am. Ceramc. Soc., 1944, 27 [8] pp. 225-231.

Tykachinsky et al., "Effect of find grinding of glass batch," Glass Ceram., 1956, pp. 7-16.

Boffe et al, "The influence of the size of raw materials on the rate of melting of glass," Glass Technol., 1962, 3 [4] pp. 117-123.

Suda et al., "Synthesis of MgO—SiO2 and CaO—SiO2 amorphous powder by sol-gel process and ion exchange," J Non-Cryst Solids, 1999, pp. 178-184.

Kalousek et al., "Studies of portions of the quaternary system soda-lime-silica-water at 25C," National Bureau of Standards Research Paper RP1590, 1944, pp. 285-302.

Way et al., "Study of Some Synthetically prepared hydrous alkali calcium silicates," Cement and Concrete Research, vol. 2, 1992, pp. 915-926.

\* cited by examiner

| Component (mol%) | Soda-Lime-Silica Glass | Borosilicate Fiber (E-Glass) | Borosilicate Glass (Flat Panel Display) | Borosilicate Glass (Low Thermal Expansion) | Borosilicate Glass (Fiber Wool) | Lead Sealing Glass |
|---|---|---|---|---|---|---|
| $SiO_2$ | 63–81 | 43–74 | 60–80 | 65–85 | 50–78 | 30–67 |
| $Al_2O_3$ | 0–2 | 6–10 | 5–15 | 1–5 | 0–4 | 0–7 |
| $B_2O_3$ | -- | 0–8.5 | 5–15 | 8–15 | 2.5–9 | 0–25 |
| $MgO$ | 0–6 | 0.5–9 | -- | -- | 1.5–8 | 0–2 |
| $CaO$ | 7–14 | 15–28 | 2–10 | 0–2.5 | 5–15 | 0–5 |
| $SrO$ | -- | -- | 0–5 | -- | -- | -- |
| $BaO$ | -- | -- | 0–3 | -- | -- | 4–10 |
| $Li_2O$ | 0–2 | 0–1 | -- | -- | -- | -- |
| $Na_2O$ | 9–15 | 0–2.5 | -- | 3–9 | 12–18 | 2–10 |
| $K_2O$ | 0–1.5 | 0–0.5 | -- | -- | 0–1.5 | 3–15 |
| $Fe_2O_3$ | 0–0.6 | 0–0.3 | -- | -- | 0–0.3 | -- |
| $Cr_2O_3$ | 0–0.2 | 0–0.2 | -- | -- | -- | -- |
| $MnO_2$ | 0–0.2 | -- | -- | -- | -- | -- |
| $Co_3O_4$ | 0–0.1 | -- | -- | -- | -- | -- |
| $TiO_2$ | 0–0.8 | 0–1 | -- | -- | -- | -- |
| $SO_3$ | 0–0.2 | -- | -- | -- | 0–0.2 | -- |
| $Se$ | 0–0.1 | -- | -- | -- | -- | -- |
| $F$ | 0–0.1 | 0–2 | -- | -- | 0–2.5 | -- |
| $ZrO_2$ | -- | -- | -- | -- | -- | 0–3 |
| $PbO$ | -- | -- | -- | -- | -- | 15–80 |

*FIG. 3*

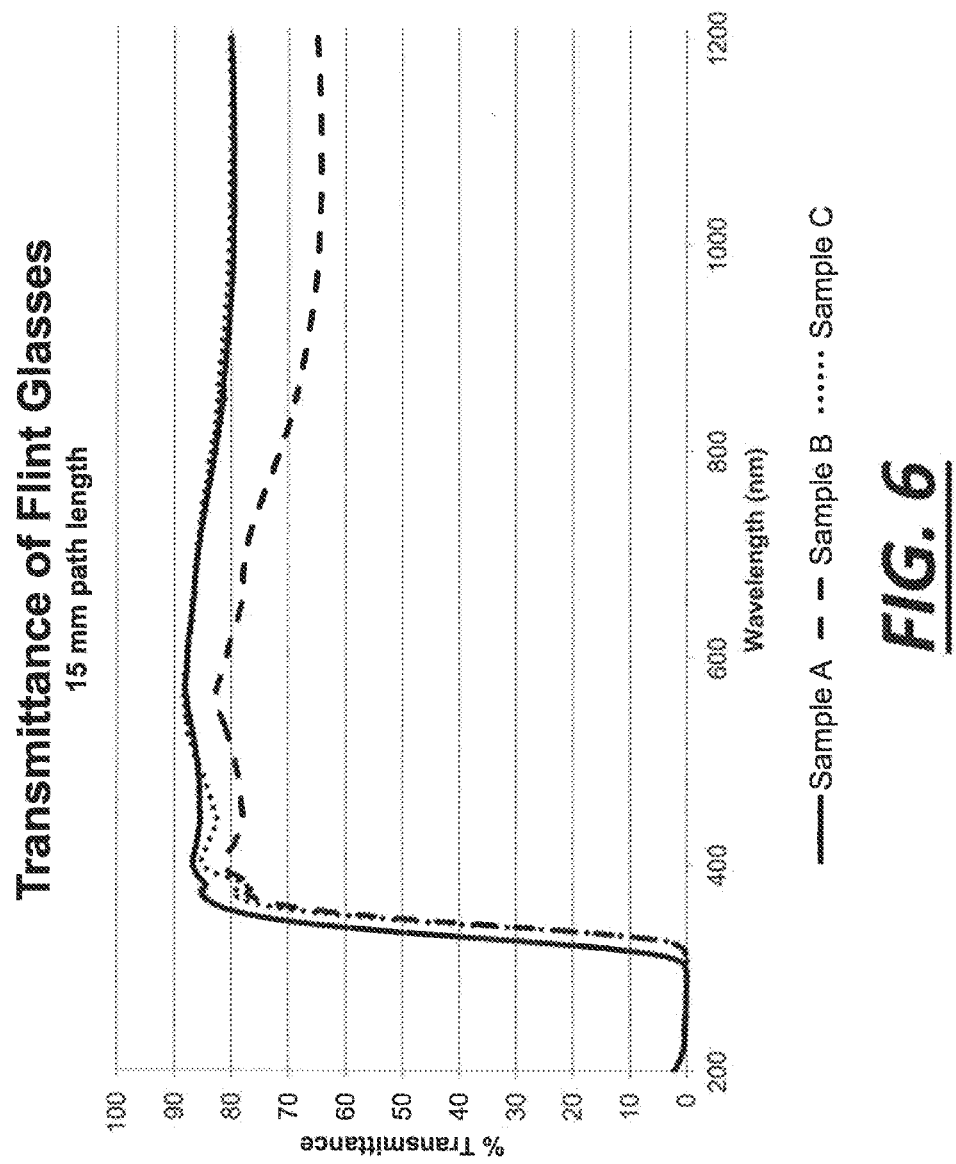

GLASS COATINGS AND METHODS TO DEPOSIT SAME

This patent application discloses a powderized or wire form glass precursor gel and, more particularly, methods to form glass substrates and/or coatings with the glass precursor gel.

BACKGROUND

Glass products have long been made from a pre-formulated feedstock (also sometimes termed a glass batch) that is charged into a glass furnace and melted to produce molten glass for subsequent formation into the desired glass product. A typical feedstock includes a physical mixture of virgin raw materials and, optionally, recycled glass materials known in the industry as "cullet." The virgin raw materials can contain quartz sand (crystalline $SiO_2$) and other ingredients, such as soda ash ($Na_2CO_3$) and limestone ($CaCO_3$) for soda-lime-silica glass, for example, and the cullet primarily contains shards of glass from previously-formed consumer or commercial glass products. The cullet component of the feedstock can vary based on the glass-forming process being practiced and the desired characteristics of the final glass product (e.g., color, transparency, etc.). In many instances, however, the feedstock may contain up to about 80 weight percent cullet, with the remainder being virgin raw materials which may or may not include, in addition to the ingredients listed above, a small percentage of other ingredients including glass network formers, network modifiers, colorants, decolorants, fining agents, and redox agents, to name but a few.

The residence time of the conventional glass feedstock in the glass furnace is relatively long. This can be attributed to several factors. First, the largest component of the virgin raw materials, quartz sand, and usually some of the other virgin raw material ingredients—e.g., soda ash and limestone for soda-lime-silica glass—are crystalline materials. Their crystal structures, including intermediate crystalline phases, are generally present up to about 1200° C., as melting and dissolution of these materials does not occur instantaneously. Second, the glass feedstock needs to be dispersed and homogeneously mixed by convection after being melted to produce molten glass, which is a time-consuming process. Quartz sand, in particular, takes the longest to disperse on account of its slow dissolution rate and the tendency to agglomerate into $SiO_2$-rich regions within the glass melt known as "cord." The presence of cord is indicative of glass inhomogeneity and may result in imperfections or defects in the finished glass product. Third, some of the virgin raw material ingredients—e.g., soda ash and limestone for soda-lime-silica glass—are carbonate-containing materials that, when melted, release carbon dioxide ($CO_2$). The evolution of carbon dioxide during feedstock melting introduces bubbles in the resultant molten glass, which, in turn, can cause a thin spot or bubble defect in the finished glass product. Any such bubbles are typically removed from the molten glass in a process known as "refining the glass." To address the challenges associated with melting and homogenizing crystalline raw materials and to remove bubbles caused by carbon dioxide evolution, among other factors, conventional glass feedstocks are usually subjected to high temperatures and heating times of 24 hours or more in the glass furnace in order to obtain suitably-refined and chemically homogenized molten glass.

The melting of the glass feedstock can be made less taxing if some of the virgin raw materials are replaced with cullet in the feedstock. The cullet accelerates the melting of the feedstock and lowers furnace energy consumption as compared to a feedstock that contains all virgin raw materials. Cullet has this effect because it has already been melted, mixed, and formed into a glass product and will not release carbon dioxide when re-melted since it is not an intrinsic carbonate-containing material. But cullet is not widely available as a commodity in some regions and, even if it is, bulk purchases of the recycled material are subject to great variations in color and other characteristics that may restrict glass manufacturing options. Post-consumer cullet also has the tendency to be contaminated with metals, glues, and other organics, and is sometimes difficult to uniformly mix with virgin raw materials in the glass furnace when melted. Moreover, even with the addition of cullet, current glass manufacturing practices still typically involve melting the glass feedstock and homogenizing/refining the molten glass in the glass furnace at a temperature of around 1400° C. or higher for at least about 24 hours. Such long processing times at elevated temperatures require a lot of energy and slow the overall glass-making process. Additionally, these long processing times limit further processing options for the molten glass.

BRIEF SUMMARY OF THE DISCLOSURE

The present disclosure embodies a number of aspects that can be implemented separately from or in combination with each other. One or more embodiments set forth in the present disclosure may achieve any of a variety of objectives including, for example, obtaining a dried glass precursor gel that can be melted without requiring long residence times in the glass furnace in order to achieve homogeneous and refined molten glass. Shorter melt times may be required for various further processing techniques of the molten glass, such as thermal spraying, plasma spraying, high velocity oxy-fuel flame spraying, arc spray, flame spray, and the like.

In accordance with one aspect of the disclosure, there is provided a method of producing a glass substrate by, first, obtaining a dried glass precursor gel comprising a bulk amorphous oxide-based matrix having an inorganic network of primary constituent oxides. The primary constituent oxides can include 30 mol % to 90 mol % silica ($SiO_2$) and one or more of the following: (A) 0.1 mol % to 25 mol % of one or more alkali oxides in sum total, (B) 0.1 mol % to 30 mol % of one or more alkaline earth oxides in sum total, (C) 1 mol % to 25 mol % boric oxide, (D) 5 mol % to 80 mol % lead oxide, or (E) 0.1 mol % to 15 mol % aluminum oxide. After obtaining the dried glass precursor gel, the method includes forming a powder or wire from the dried glass precursor gel. After forming a powder or wire, the method includes melting the powder or wire with a gas stream to form molten droplets. After melting the powder or wire, the method includes depositing the molten droplets onto a mold (e.g., creating a mold coating) to form the glass substrate.

In accordance with another aspect of the disclosure, there is provided a method of forming or producing a glass coating on a solid glass substrate, by, first, obtaining a dried glass precursor gel comprising a bulk amorphous oxide-based matrix having an inorganic network of primary constituent oxides. The primary constituent oxides can include 30 mol % to 90 mol % silica ($SiO_2$) and one or more of the following: (A) 0.1 mol % to 25 mol % of one or more alkali oxides in sum total, (B) 0.1 mol % to 30 mol % of one or more alkaline earth oxides in sum total, (C) 1 mol % to 25 mol % boric oxide, (D) 5 mol % to 80 mol % lead oxide, or (E) 0.1 mol % to 15 mol % aluminum oxide. After obtaining the dried glass precursor gel, the method includes forming a powder or wire from the dried glass precursor gel. After forming a powder or wire, the method includes melting the powder or wire with a gas stream to form molten droplets. After melting the powder or wire, the method includes depositing the molten droplets onto the solid glass substrate to form the glass coating.

The melting temperature and/or the time to obtain a dried glass precursor gel and/or melt the powder can be significantly lower than those requirements with conventional glass feedstock, enabling the precursor gel to be converted into glass forms by methods not possible for conventional glass feedstocks. Additionally, the methods discussed herein will produce no carbon dioxide or substantially no carbon dioxide during formation of the dried glass precursor gel and/or the powder or wire form. This reduces the carbon emissions of those utilizing this method as compared to those utilizing conventional glass melting furnaces.

In any of the methods described herein, the glass precursor gel can be formed by, first, obtaining a wet glass precursor gel having the bulk amorphous oxide-based matrix being homogeneously chemically mixed and having a gel density of less than 2.0 g/cm$^3$. Second, the method includes drying the wet glass precursor gel to form the dried glass precursor gel before the step of obtaining a dried glass precursor gel. In one example, this drying step involves removing solvents in the wet glass precursor gel or wet precipitate by drying the wet precipitate at a drying temperature of 120° C.

BRIEF DESCRIPTION OF THE DRAWINGS

The disclosure, together with additional objects, features, advantages and aspects thereof, will be best understood from the following description, the appended claims and the accompanying drawings, in which:

FIG. 3 is a table listing several different possible compositions of the bulk amorphous oxide-based matrix of the glass precursor gel depending on the desired type of glass sought to be formed;

FIG. 6 is a graph depicting the % transmittance versus wavelength of commercial flint glasses made from conventional soda-lime-glass feedstocks as well as a flint glass made from the SLS precursor gel discussed in this disclosure.

DETAILED DESCRIPTION

A glass precursor gel that can be used as an alternative to traditional glass feedstock mixtures for deriving molten glass is disclosed. The glass precursor gel comprises a bulk amorphous (i.e., non-crystalline) oxide-based matrix characterized by an inorganic network of at least the primary constituent oxides of the final glass composition. The primary constituent oxides are present in the amorphous oxide-based matrix at the desired proportions of the final glass composition. More specifically, the primary glass-forming constituent oxides included in the amorphous oxide-based matrix are 30 mol % to 90 mol % silica and one or more of the following: (A) 0.1 mol % to 25 mol % of one or more alkali oxides (mol % is the sum total); (B) 0.1 mol % to 30 mol% of one or more alkaline earth oxides (mol % is the sum total); (C) 1 mol % to 25 mol % boric oxide ($B_2O_3$); (D) 5 mol % to 80 mol % lead oxide (PbO), or (E) 0.1 mol % to 15 mol % aluminum oxide ($AL_2O_3$). The one or more alkali oxides may be selected from the group consisting of lithium oxide ($Li_2O$), sodium oxide ($Na_2O$), potassium oxide ($K_2O$), rubidium oxide ($Rb_2O$), cesium oxide ($Cs_2O$), and combinations thereof, and the one or more alkaline earth oxides may be selected from the group consisting of magnesium oxide (MgO), calcium oxide (CaO), strontium oxide (SrO), barium oxide (BaO), and combinations thereof. The glass precursor gel is similar to that disclosed in U.S. patent application Ser. No. 14/676,372, which is assigned to the assignee hereof and incorporated herein by reference in its entirety. Additionally, this application relates to U.S. patent application Ser. No. 15/284,263, entitled "Glass Precursor Gel and Methods to Treat with Microwave Energy," filed Oct. 3, 2016, and U.S. patent application Ser. No. 15/284,278, entitled "Glass Foam," filed Oct. 3, 2016, each of which are assigned to the assignee hereof and incorporated herein by reference in their entireties.

Figure 1:
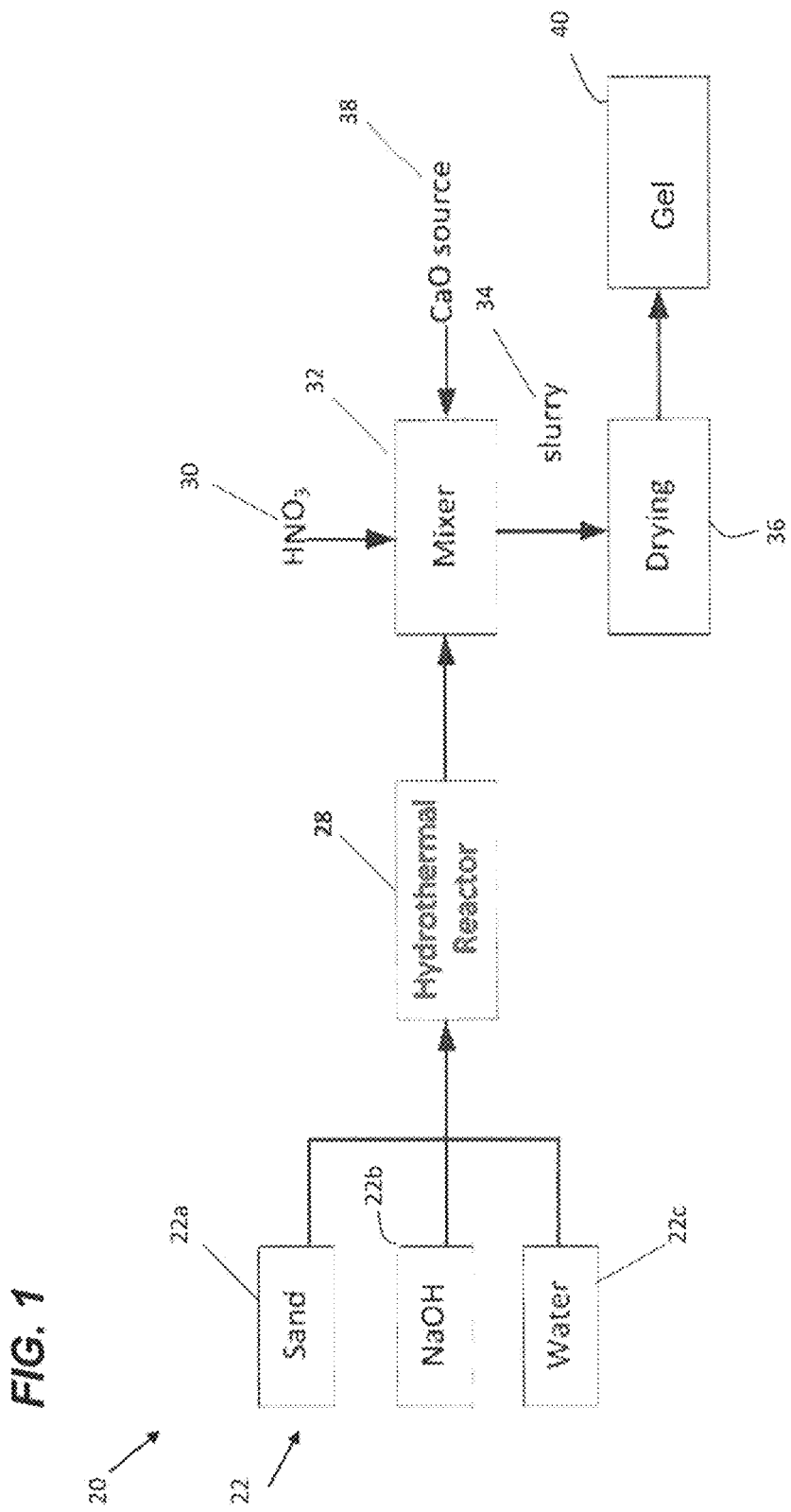
FIG. 1 is a flow diagram that depicts a first method of preparing and using a glass precursor gel.

One illustrative example of forming the glass precursor gel is depicted in FIG. 1. FIG. 1 is a flow diagram 20 that depicts a first method of preparing the gel. In step 22, quartz sand having silica ($SiO_2$) 22a, NaOH 22b, and water 22c are mixed together. In step 22, mixing the sand with caustic components (e.g., NaOH 22b) causes the sand to be dissolved hydrothermally at moderate temperatures, as will be discussed further below. This chemical dissolution contributes to the final gel having reduced melting time. In step 28, these three components are added to a hydrothermal reactor. In step 32, these components are moved to a mixer, in which nitric acid ($HNO_3$) 30 and a soluble source of CaO 38 are added to form the oxide-based matrix. As discussed herein, additional components could be added to the mixer in step 32.

In one embodiment, the amorphous oxide-based matrix may include at least 60 mol % to 85 mol % silica ($SiO_2$), 8 mol % to 18 mol % sodium oxide ($Na_2O$), and 5 mol % to 15 mol % calcium oxide (CaO) as the primary constituent oxides, in which case the gel is composed to produce soda-lime-silica glass. In other embodiments, the glass precursor gel may be composed to produce other types of glass including borosilicate glass and lead sealing glass. Regarding borosilicate glass, the amorphous oxide-based matrix may include at least 30 mol % to 85 mol % silica and 0 mol % to 20 mol % boric oxide, along with at least one of 0 mol % to 30 mol % calcium oxide or 0 mol % to 20 mol % sodium oxide, as the primary constituent oxides depending on the anticipated end-use. Regarding lead sealing glass, the amorphous oxide-based matrix may include at Last 30 mol % to 70 mol % silica, 15 mol % to 80 mol % lead oxide, and at least one of 3 mol % to 15 mol % potassium oxide, 2 mol % to 10 mol % sodium oxide, or 4 mol % to 10 mol % barium oxide, as the primary constituent oxides.

It addition to the primary constituent oxides, the amorphous oxide-based matrix may optionally include a number of secondary materials that are commonly used in the glass manufacturing industry. Examples of such secondary materials are up to 25 mol % total of other glass network-formers, up to 2 mol % total of coloring and/or decoloring agents, and up to 20 mol % total of other materials that can affect the physical properties and/or the redox state of the final glass product composition. Specific other glass network-formers that may be added include one or more of phosphorus oxide ($P_2O_5$) and germanium Oxide ($GeO_2$). Specific colorants and decolorants that may be added include the elemental forms or oxide compound forms of one or more of selenium, chromium, manganese, iron, cobalt, nickel, copper, niobium, molydenum, silver, cadmium, indium, tin, gold, cerium, praseodymium, neodymium, europium, gadolinium, erbium, and uranium. And specific materials that can affect the physical properties and/or the redox state of the glass include one or more of carbon (0 mol % to 3 mol %), nitrates (0 mol % to 3 mol %), selenium (0 mol % to 1 mol %), titanium oxide ($TiO_2$) (0 mol % to 5 mol %), arsenic oxide ($As_2O_3$) (0 mol % to 2 mol %), vanadium oxide ($V_2O_5$) (0 mol % to 5 mol %), fluorines (0 mol % to 2 mol %), chlorines (0 mol % to 2 mol %), and sulfates (0 mol % to 2 mol %).

The exact composition of the amorphous oxide-based matrix including the proportions of its primary constituent oxides and optional secondary materials can be varied to achieve any of the large variety of glass chemistries that may be desired in the final glass product. Both the physical and chemical properties of the resultant glass derived from the glass precursor gel can be affected by variances in the relative proportions of the primary constituent oxides as well as the inclusion or exclusion of certain secondary materials in the amorphous oxide-based matrix. For example, certain exemplary glass chemistry formulations of different types of finished glass are enumerated in FIG. 3. Accordingly, in order to derive these types of finished glass from the glass precursor gel, the amorphous oxide-based matrix can be prepared to have the same proportions of the primary constituent oxides and secondary materials so that, upon melting, a molten glass is obtained that can be formed by standard techniques into the glass product.

Within the amorphous oxide-based matrix, the primary constituent oxides and any secondary materials, which may or may not be present, are homogeneously chemically mixed (e.g., FIG. 1, mixing step 32). The term "homogeneously chemically mixed" and its grammatical variations, as used herein, means that multiple different samples of the gel will have the same mole percentages of the three primary constituent oxides present in the greatest amounts in the amorphous oxide-based matrix. Different samples can be said to have the same mole percentages of the three primary constituent oxides when the mole percent of each primary constituent oxide in each sample lies within a range of ±3% of the arithmetic average [i.e., (0.97)·(average)<sample< (1.03)·(average)] of its respective oxide as determined from the various samples taken. For example, five random, different samples of a glass precursor gel have been found through x-ray fluorescence to have the following mole percentages of the three main primary constituent oxides (here, silica, sodium oxide, and calcium oxide):

TABLE 1

Compositions of Samples

| Sample # | Mole Percentage of: | | |
|---|---|---|---|
| | $SiO_2$ | $Na_2O$ | $CaO$ |
| 1 | 72.3 | 14.2 | 12.1 |
| 2 | 72.2 | 14.1 | 12.2 |
| 3 | 71.8 | 14.2 | 12.5 |

TABLE 1-continued

Compositions of Samples

| Sample # | Mole Percentage of: | | |
|---|---|---|---|
| | $SiO_2$ | $Na_2O$ | $CaO$ |
| 4 | 72.1 | 14.1 | 12.4 |
| 5 | 72.5 | 13.9 | 12.3 |
| Avg. | 72.2 | 14.1 | 12.3 |

As can be seen, in this group of samples, the arithmetic average of silica, sodium oxide, and calcium oxide as determined from the five samples is 72.2 mol %, 14.1 mol %, and 12.3 mol %, respectively. The range of ±3% of the arithmetic average for each of the primary constituent oxides can then be calculated as 70.03-74.34 mol % for silica, 13.68-44.52 mol % for sodium oxide, and 11.93-12.67 mol % for calcium oxide. The mole percentage of each primary constituent oxide in each sample clearly falls within those prescribed ranges, and thus confirms that the amorphous oxide-based matrix of the glass precursor gel is homogeneously chemically mixed.

The amorphous oxide-based matrix of the present disclosure is different than a glassy polymer network or glassy polymer. Polymers are large molecules, or macromolecules, formed of repeating monomer subunits. Polymers often contain continuously linked backbone chains, made up primarily of carbon atoms. A polymer microstructure is formed by the physical arrangement or geometry of the monomer residues along the backbone chain.

Polymers can have the ability or tendency to form a glass or semicrystalline structure, made of the repeating monomer subunits. Due to their ability to form non-crystalline or amorphous solid structures and exhibit a glass transition when heated, polymers can be generally categories as glass structures, but these glassy polymer structures are distinguishable from traditional or conventional glass (e.g., silica glass) because of their monomer, organic networks. In one aspect, the glass precursor gel of the present application is not a glassy polymer or glassy polymer network with repeating, organic monomers.

Returning to FIG. 1, whichever components are chosen to form the mixture, upon mixing, these components form a slurry 34 (e.g., SLS slurry). In step 36, the slurry 34 is dried. This forms the dried glass precursor gel in step 40.

The amorphous oxide-based matrix is light, porous, and hygroscopic, which allows for an extending swelling agent, such as water, to be entrapped within the inorganic network of oxides. Indeed, water is typically retained in the glass precursor gel at a relatively high amount as compared to cullet. In particular, cullet evolves water vapor up to about 125° C. when heated at a rate of 5° C. per minute starting from STP (1 atm pressure and 20° C.), and is thoroughly dried for the most part at 150° C., which is typical of physically entrained water. On the other hand, the glass precursor gel continues to evolve water vapor—an additional 1-10 wt. %—125° C. and up to 400° C. when subjected to the same incremental heating, and may even retain as much as 0.5 wt. % water at 400° C., which is indicative of water that is chemically bound to amorphous oxide-hared matrix as a swelling agent. The presence of retained chemically-bound water within the amorphous oxide-based matrix may be advantageous in some instances since it acts as a flux that lowers the processing temperature of the dried glass precursor gel and/or the molten glass, particularly at low temperatures. And despite the fact that the glass precursor gel typically includes chemically-entrained water within its amorphous oxide-based matrix, the glass precursor gel has a density of less than 2.0 g/cm$^3$, preferably between 1.6 g/cm$^3$ and 1.85 g/cm$^3$, including all ranges, subranges, and values therebetween, and a surface area of at least 20 m$^2$/g, preferably about 25 m$^2$/g to about 40 m$^2$/g, including all ranges, subranges, and values therebetween, as measured by nitrogen BET adsorption. The glass precursor gel is thus less dense and has a higher surface area than cullet. In some aspects, the density of the glass precursor gel is less than 600 m$^2$/g.

In addition to the water, the gel can have excess nitrate ions, $NO_3^-$. As shown in FIG. 1, step 30, nitric acid is added to the mixture, which reacts with the additional components to form nitrate ions. As will be discussed further below, nitric acid can neutralize some of the sodium silicate into silicic acid and sodium nitrate. Additionally, the dried glass precursor gel contains nanometer-sized pores with its bulk amorphous oxide-based matrix.

In some aspects, the dried glass precursor gel does not include large quantities of crystalline materials and, most notably, the amorphous oxide-based matrix does not contain any crystalline precursor materials of silica such as, for example, quartz sand, as will be discussed further below. The absence of quartz sand is noteworthy here. Unlike conventional glass feedstocks that contain a fair amount of quartz sand, which generally has a slow dissolution rate, the glass precursor gel does not have to be maintained in a molten state at high temperatures for long durations in order to achieve satisfactory SiO$_2$ dissolution. Other crystalline materials that may be omitted during formation of the dried glass precursor gel are pre-melted glass, recycled glass, rock, clay, ore, and/or ash.

The amorphous oxide-based matrix also includes virtually no carbonate-containing materials and, as such, will produce no more than a negligible amount of $CO_2$ upon melting and hence substantially no $CO_2$ bubbles within the molten glass, although there may be bubbles from trapped air pockets, nitrate decomposition, and water evolution. For purposes of this disclosure, "substantially" means that a given quantity is no more than 10%, preferably no more than 5%, more preferably no more than 1%, of a comparison value (e.g., volumetric value in a molten or solidified state). For example, "substantially no" carbon dioxide means to reduce the volume of any remaining carbon dioxide such that the volume of the total glass gel precursor with any remaining $CO_2$ is no more than 10%, preferably no more than 5%, more preferably no more than 1% greater than the volume of the glass gel precursor alone. This could be measured either in the molten state or after gelation. The amount of any remaining $CO_2$ could also be compared to the volume of gas generated from melting raw materials from batch (sand, soda ash, limestone, and the like).

The molten glass obtained from the dried glass precursor gel therefore does not have to be refined by removing substantial amounts of entrained bubbles through extended heating times. Given that the amorphous oxide-based matrix is already homogeneously chemically mixed and does not contain crystalline precursor materials of the primary constituent oxides or more than an insignificant amount of carbonate-containing materials, the glass precursor gel does not have to be heated to as high of a temperature or maintained at an elevated temperatures for as long of a timeframe as conventional glass feedstocks in order to obtain a molten glass that is suitable for downstream processing into a glass product.

To be sure, as mentioned above, conventional soda-lime-silica glass feedstocks are typically melted in a furnace and maintained at 1400° C. or higher for at least about 24 hours in order to obtain a suitably refined and homogenized molten glass. The glass precursor gel set forth in the present disclosure does not require—although it certainly does not preclude—such heat cycle demands.

The glass precursor gel can be chemically synthesized. By doing so, the three rate-limiting steps of conventional glass making—dissolution of quartz sand, bubble removal, and homogenization/mixing of the primary constituent oxides—are accomplished at low temperatures by way of chemical reactions, not the standard procedure in which crystalline raw materials (and optionally some cullet) are physically mixed, melted, and maintained in a molten state to facilitate dissolution. Specifically, the glass precursor gel can be chemically synthesized at temperatures below 300° C., which is well below the melting point of quartz sand. Due to this, the glass precursor gel can be attained more quickly and with less energy consumption than conventional glass feedstocks.

Once formed, the glass precursor gel can be melted into molten glass or molten droplets, which can then be formed into a glass product such as, for example, a glass container or flat glass or tableware, to name but a few. The resulting dried glass precursor gel is processed via a thermal spraying technique that will be discussed further below.

The dried glass precursor gel can be chemically synthesized by precipitating the gel from a soluble alkali silicate. In general, a silicate solution containing the soluble alkali silicate is first prepared. One way to prepare the silicate solution., for example, is to hydrothermally dissolve quartz sand in a caustic aqueous alkali-based solvent. The ratio of SiO$_2$ to the alkali oxide in the alkali silicate can be adjusted in solution as needed. Next, the alkali silicate is precipitated out of solution with an alkaline earth salt to provide a wet precipitate that, by design, has the same proportions of the primary constituent oxides as the desired end-use glass composition. And finally, solvent may be removed from the wet precipitate to derive the dried glass precursor gel.

The dried glass precursor gel of the present disclosure does not require the use of a mold or similar vessel during formation. The dried glass precursor gel can be chemically synthesized as discussed above, and this synthesis does not require that the raw materials and/or resulting gel are contained, gelled, dried, confined, or otherwise placed within a mold or similar container during synthesis. While the gel and any resulting glass containers may be subsequently processed through the use of a mold or similar vessel, the dried glass precursor gel does not require a mold in order to be formed.

Figure 2:
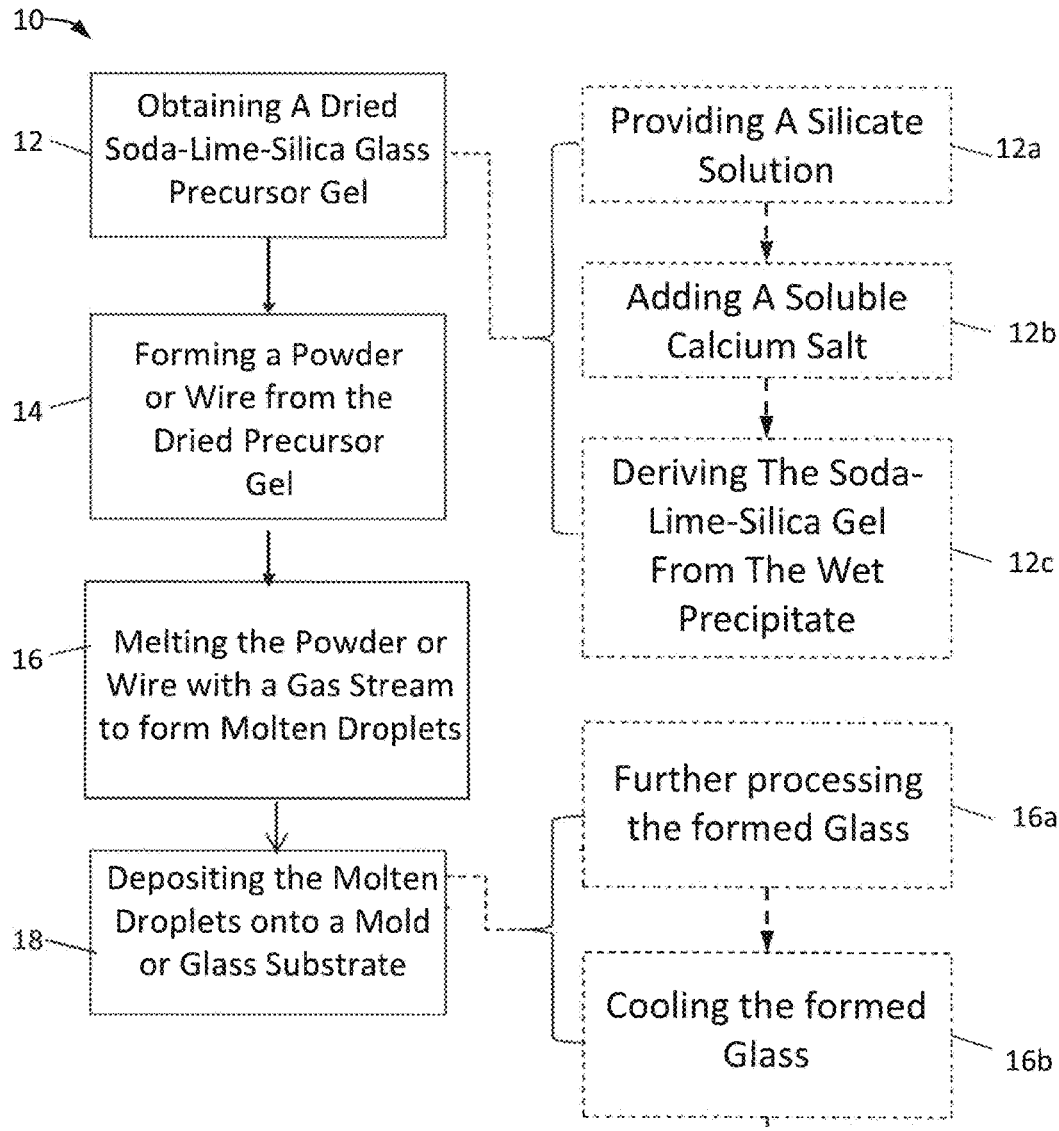
FIG. 2 is a flow diagram that depicts a second method of preparing and using the glass precursor gel, in particular a soda-lime-silica glass precursor gel.

The glass precursor gel can be used to make a glass product as shown diagrammatically in FIG. 2. There, the method of making a glass product is illustrated, and described in the corresponding text, specifically in the context of using one type of the glass precursor gel—namely, a soda-lime-silica ("SLS") glass precursor gel. The method is identified by reference numeral 10 and includes the following steps: obtaining the dried glass precursor gel (step 12); forming a powder or wire from the dried glass precursor gel (step 14); melting the powder or wire with a gas stream to form molten droplets (Step 16); and depositing the molten droplets onto a mold to form a glass substrate or, alternatively, onto a solid glass substrate to form a glass coating (step 18). The method is preferably used to form glass containers such as bottles and jars. These types of containers may include a glass body that defines an interior for holding some content. The interior is typically accessible from a mouth that is located at one axial end of the glass body. The mouth may be constructed to receive a cap or lid. Other types of glass products may of course be made from the SLS glass precursor gel besides containers. While the method shown and described with reference to FIG. 2 is focused on the preparation and use of a SLS glass precursor gel, those skilled in the art will know and understand how to adapt the following teachings to other types of glass precursor gels such as gels composed to produce, for example, borosilicate glass or lead scaling glass.

The SLS glass precursor gel is comprised of a bulk amorphous oxide-based matrix that includes at least silica ($SiO_2$), sodium oxide ($Na_2O$), and calcium oxide (CaO) as the primary constituent oxides, and chemically-entrained water as the extending swelling agent. The amorphous oxide-based matrix of the SLS glass precursor gel, for example, preferably comprises 60 mol % to 85 mol % silica, 8 mol % to 18 mol % sodium oxide, and 5 mol % to 15 mol % calcium oxide.

The amorphous oxide-based matrix may also optionally include up to about 10 mol % combined of aluminum oxide, magnesium oxide (MgO), and/or potassium oxide ($K_2O$) as additional primary constituent oxides, and any of the other secondary materials recited above including other glass-network formers, colorants such as iron oxide ($Fe_2O_3$), other agents (e.g., oxidizers, reducers, fining agents, etc.), and impurities common in the glass industry. Moreover, as described above, water is chemically-entrained within the amorphous oxide-based matrix such that, when the gel is heated at a rate of 5° C. per minute starting from STP (1 atm pressure and 20° C.), water vapor continues to evolve above 125° C. and up to 400° C., and may even retain as much as 0.5 wt % water at 400° C. The SLS glass precursor gel is porous and friable, having a density of less than about 2.0 g/cm$^3$ and a surface area greater than about 20 m$^2$/g, as described above, and the components that make up the amorphous oxide based matrix are already homogenously chemically mixed prior to being melted in step 16.

While one method of producing the dried glass precursor gel is described in FIG. 1. It is also possible to produce the dried glass precursor gel in other ways. In another aspect, as depicted here in FIG. 2, the SLS glass precursor gel is obtained by (1) providing a silicate solution that includes a dissolved soluble alkali silicate (e.g., sodium silicate) (step 12*a*); (2) combining the silicate solution with a soluble calcium salt to form a wet precipitate (step 12*b*); and (3) deriving a dried SLS gel from the wet precipitate (step 12*c*). A specific implementation of steps 12*a*-12*c* will be described below in more detail. It should be understood, however, that the SLS glass precursor gel can also be obtained through other mechanisms not expressly described, but nonetheless known to skilled artisans, including alternative ways to provide the silicate solution in step 12*a* such as by purchasing and/or obtaining the silicate solution or chemically preparing the solution by melting a mixture of quartz sand and soda ash and then dissolving the resultant product in water.

The silicate solution can he provided in step 12*a* by hydrothermally dissolving quartz sand in a caustic aqueous sodium-based solvent. The caustic aqueous sodium-based solvent may be a strong sodium base, such as sodium hydroxide (NaOH), which is preferably concentrated to greater than 10 wt. % (of the sodium base) so as to make dissolution of the quartz sand easier. One example of a suitable strong sodium base is 18 wt. % NaOH, The hydrothermal dissolution of quartz sand may be accomplished in a pressure vessel at a pressure above atmospheric pressure. There, the quartz sand may be dissolved in the caustic aqueous sodium-based solvent at a temperature between about 25° C. and about 300° C., including all ranges, subranges, and values therebetween, preferably between about 200° C. and about 300° C., and a pressure of about 10 atmospheres to about 100 atmospheres, including all ranges, subranges, and values therebetween, preferably about 30 atmospheres to about 50 atmospheres, over the course of about 3 hours to less than 24 hours, including all ranges, subranges, and values therebetween. The silicate solution formed under these hydrothermal conditions contains a dissolved solids phase of sodium silicate. The dissolved sodium silicate produced has the general chemical formula $Na_2O \cdot xSiO_2$ with x ranging from 1.5 to 3.75, including all ranges, subranges, and values therebetween.

While the dissolved sodium silicate can be produced under various pressures, this dissolution process may occur without utilizing a gas stream (e.g., helium and/or hydrogen gas) in the place of air. The dissolved sodium silicate and the resulting dried glass precursor gel can he formed without using a helium and/or hydrogen gas stream.

The ratio of $Na_2O$ to $SiO_2$ in the dissolved sodium silicate may have to be adjusted to ensure the amorphous oxide-based matrix of the SLS glass precursor gel has the proper mole percentages of silica, sodium oxide, and calcium oxide. In particular, the mole percent proportions of the primary constituent oxides listed above can be met when the amorphous oxide-based matrix has a molar ratio of $Na_2O$:$CaO$:$SiO_2$ of approximately 1:1:6 with variances between 0.8:0.8:6 and 1.4:1.3:6 being acceptable for typical container glass. The dissolved sodium silicate in the silicate solution, however, typically includes 2-3 moles of $Na_2O$ for every 6 moles of $SiO_2$. To adjust the molar ratio of $Na_2O$ to $SiO_2$, if necessary, a multiple-step technique may be employed. First, the molar ratio of $Na_2O$ to $SiO_2$ in the dissolved sodium silicate may be reduced with an acid. Nitric acid ($HNO_3$), for example, can be added to the silicate solution in a quantity that neutralizes some of the $Na_2O$ to bring the molar ratio of $Na_2O$ to $SiO_2$ in the dissolved sodium silicate down to approximately 2:6. Nitric acid neutralizes sodium silicate into silicic acid ($SiH_4O_4$) and forming sodium nitrate ($NaNO_3$). A further reduction of the molar ratio of $Na_2O$ to $SiO_2$—down to approximately 1:6—is achieved in step 12(*b*) when, as will be explained in more detail below, sodium is displaced by calcium.

Other primary constituent oxides and secondary materials that may be desired in the amorphous oxide-based matrix of the SLS glass precursor gel may be added into the silicate solution during step 12*a* as a solid or they may be dissolved in water prior to their addition into the solution. Some other materials that may be added into the silicate solution include aluminum. oxide, magnesium oxide, potassium oxide, iron oxide, titanium oxide, zirconium oxide, barium oxide, strontium oxide (SrO), sulfur trioxide ($SO_3$), and oxides of selenium, cobalt, chromium, manganese, and lead. Aluminum oxide, in particular, which enhances the chemical durability of soda-lime-silica glass and reduces the tendency of devitrification in the molten glass, may be introduced by adding an alumina-bearing mineral to the caustic aqueous sodium-based solvent along with quartz sand under hydrothermal conditions. Adding the alumina-bearing material at this time results in aluminum oxide being chemically integrated into the dissolved sodium silicate during hydrothermal dissolution of the quartz sand. Some examples of alumina-bearing minerals that may be used here are nepheline syenite, aplite, and calumite slag. The aluminum oxide may also be introduced into the silicate solution in the form of dissolved sodium aluminate.

The list of secondary materials that may be introduced into the silicate solution during step 12a is more extensive than those just mentioned. Colorants and decolorants may be added such as one or more of iron oxides (e.g., FeO and/or $Fe_2O_3$), chromium oxides (e.g., CrO or $Cr_2O_3$), cobalt oxides (e.g., CoO or $Co_2O_3$), nickel, copper, selenium, manganese dioxide, cerium oxide, titanium, and a combination of sulfur, iron, and carbon. Another class of secondary materials that can be added to the silicate solution is fining agents such as, for example, the combination of sodium sulfate ($Na_2SO_4$), carbon, arsenic oxide, and antimony oxide. Still further, oxidizers or reducers can be added to the silicate solution to modify, if desired, the redox number of the molten glass derived from the SLS glass precursor gel. Examples of common oxidizers and reducers include calcium sulfate ($CaSO_4$), sodium nitrate ($NaNO_3$), potassium nitrate ($KNO_3$), iron pyrite ($FeS_2$), and graphite.

After the silicate solution has been formulated in step 12a, the soluble calcium salt may be added to the silicate solution in step 12b to derive a wet precipitate that has same proportions of the primary constituent oxides (e.g., silica, sodium, and calcium) desired in the amorphous oxide-based matrix of the SLS glass precursor gel. This step involves adding the soluble calcium salt to the silicate solution in an amount that brings the molar ratio of $Na_2O:CaO:SiO_2$ in the wet precipitate to approximately 1:1:6, which is the desired molar ratio of the amorphous oxide-based matrix and, in turn, the soda-lime-silica glass produced from the SLS glass precursor gel. The soluble calcium salt may include, for example, calcium nitrate ($Ca(NO_3)_2$), calcium chloride ($CaCl_2$), calcium hydroxide ($Ca(OH)_2$) or any other soluble calcium salt or combination of soluble salts that provides a source of calcium ions. When added to the silicate solution, the calcium ions provided by the soluble calcium salt displace sodium in the dissolved sodium silicate, thus introducing calcium oxide into the silicate, which causes the newly-modified sodium silicate to precipitate out of solution as the wet precipitate. And since every 1 mole of calcium ions (which results in a corresponding mol of CaO) displaces 1 mole of $Na_2O$ in the dissolved sodium silicate, the amount of the soluble calcium salt that needs to be added to the silicate solution to provide the wet precipitate with the 1:1:6 molar ratio of $Na_2O:CaO:SiO_2$ can be easily calculated based on the molar ratio of $Na_2O:SiO_2$ in the silicate solution from step 12a. Additionally, nitric acid can be added in step 12b to introduce nitrate ions in the solution. These ions contribute to neutralizing a portion of the sodium silicate into silicic acid ($SiH_4O_4$) and sodium nitrate ($NaNO_3$).

The displacement of $Na_2O$ with CaO, and the precipitation of the wet precipitate, is preferably carried out with the silicate solution being as concentrated as possible. It has been found, in fact, that as the dissolved sodium silicate becomes more dilute in the silicate solution, the amount of $Na_2O$ in the wet precipitate decreases while the amounts of $SiO_2$ and CaO are not similarly affected. This, in turn, can increase the respective mole percentages of $SiO_2$ and CaO in the wet precipitate, potentially beyond what is acceptable, due to the isolated loss of $Na_2O$. The potential for the unintended loss of $Na_2O$ during step 12c can thus be countered by performing step 12 with a concentrated silicate solution. A suitably concentrated silicate solution may comprise at least 5 wt. % sodium silicate at the end of step 12a and, more preferably, between 25 wt % and 40 wt % sodium silicate at the end of step 12a.

The phenomenon of isolated $Na_2O$ loss from the wet precipitate based on the concentration of the silicate solution has been demonstrated in a simple experiment. Specifically, four separate samples of 281 grams of STAR-grade sodium silicate were diluted with 0 L, 1 L, 2, and 3 L of water. Each solution of the sodium silicate was then precipitated with 34.5 grams of calcium nitrate dissolved in 500 mL of water. An SLS glass precursor gel was obtained from each sample, melted and formed into glass, polished, and then analyzed with x-ray fluorescence to determine its glass chemistry composition. Assuming 100% ion exchange efficiency between Na and Ca, the nominal composition of the four samples of glass reported as mol % fractions of the total primary constituent oxides should be about 72.2 mol % $SiO_2$, 15.8 mol % $Na_2O$, and 12.0 mol % CaO. But, as shown below in table 2, the $Na_2O$ mole percentage of the glass (and thus the amorphous oxide-based matrix of the SLS glass precursor gel that formed the glass) began to decrease as the dissolved sodium silicate became more dilute prior to precipitation with calcium nitrate, while the undiluted sample retained nearly all of the $Na_2O$.

TABLE 2

Effects of Dilution on Sodium Oxide Content

| | | Composition (mol %) as a fraction of the total primary glass-forming oxides | | |
|---|---|---|---|---|
| | | $SiO_2$ | $Na_2O$ | CaO |
| | Nominal | 72.1 | 15.9 | 12.0 |
| Sodium | 0 | 70.4 | 15.7 | 12.5 |
| Silicate | 1 | 72.0 | 14.1 | 12.3 |
| Dilution (L) | 2 | 72.3 | 10.3 | 15.6 |
| | 3 | 72.8 | 8.9 | 16.5 |

The dried SLS glass precursor gel can be derived from the wet precipitate in step 12c by removing the liquid solvent. Removal of the liquid solvent can be achieved by any number of separation techniques. Centrifugation, membrane osmosis, filter press, screw press, chemical separation, and/or mechanical compounding (i.e., squeezing) are notable examples of ways to separate the liquid solvent from the wet precipitate. The remaining solids—which have been chemically prepared in steps 12a to 12c to have the desired glass chemistry formulation of soda-lime-silica glass—may then be dried. Drying can be performed in a convection oven at moderate temperatures of about 100° C. to about 500° C., for example, or it can be performed in any other suitable manner at conditions sufficient to extract residual solvent from the recovered solids. In one example, the drying temperature is 120° C. Rinsing of the recovered solids between solvent removal and drying may optionally be performed to wash away any reactants and/or reaction byproducts. When the liquid solvent has been satisfactorily removed, the dried SLS glass precursor gel remains, and at this point the gel is ready to be used as a feedstock for making glass products according to steps 14 through 18.

Figure 4:
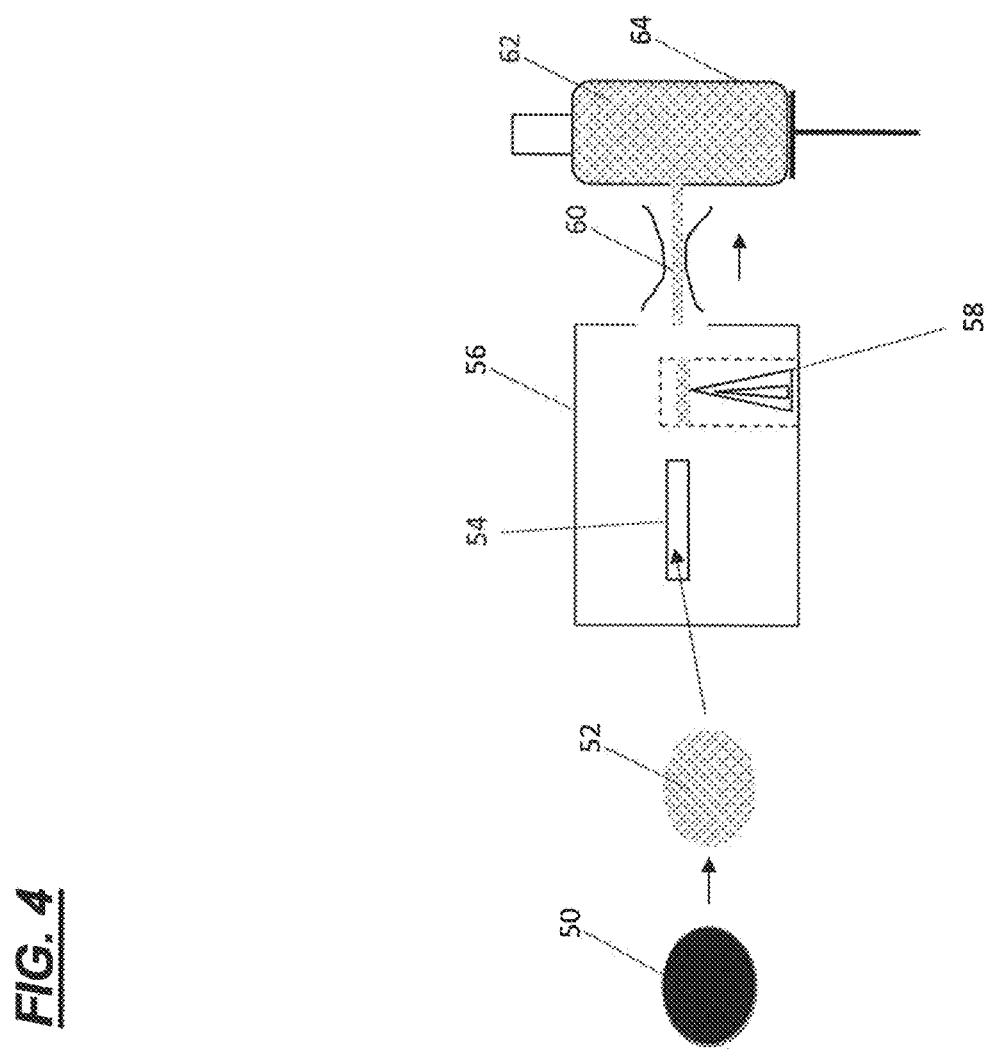
FIG. 4 depicts a method to form the glass substrate or glass coating in accordance with an illustrative embodiment of the present disclosure.

FIG. 4 illustrates one example of using the dried glass precursor gel. The dried glass precursor gel 50 can be obtained and powderized to form a powder 52. The powder 52 could also be a wire form or cylindrical substance of the dried gel if desired. Because the powder is formed from the glass precursor gel, it is also chemically homogeneously mixed on a molecular level. Powder 52 is loaded or deposited into a melting device 56, which contains a port 54 to receive the powder 52 or the wire. The melting device 56 could be a spray gun or other forming machine to further process the powder 52. The melting device 56 also contains a flame 58, depicted in a cut-out area. The powder 52 can be propelled through the melting device 56 through the use of various gases, gas streams, piping, currents, and the like so that the powder 52 arrives at flame 58. Additionally, the melting device 56 or spray gun could include water-cooled parts (e.g., water-cooled barrel). Flame 58 melts the powder 52 with a gas stream to form molten droplets 60. In one example, the flame 58 is an oxyacetylene flame. The flame could be any suitable gas, such as acetylene, methane, propane, propylene, natural gases, argon, hydrogen, helium, oxygen, air, mixtures thereof, and the like. The flame could have a temperature on the order of 3,000 K. Plasma may also be used as the flame source, in which similar or higher temperatures may be reached. Because of the short time in the flame, the efficiency of flame and/or thermal spraying, and the amount of air that is typically heated, high temperatures are often needed.

However, due to the lower temperatures required to create the dried glass precursor gel when compared with conventional methods to form molten glass, the dried glass precursor gel discussed herein is able to be formed more quickly and melted in small amounts of powder to be deposited on a target surface, which may not be possible with conventional glass feedstock. This process also avoids the use of a glass furnace that occupies a large space. Even though the flame temperature or temperature to create the molten droplets could be higher than used with conventional glass manufacturing, this temperature is only needed in a small area to melt the gel.

Upon melting, the molten droplets 60 are propelled at a high velocity toward a mold 64. The molten droplets 60 may be generally spherical, ovoid, elliptical, or have other more random geometries. The molten droplets 60 are uniformly deposited onto the exterior surface of the mold 64. In one example, the molten droplets 60 generally have a diameter in the range of 1 to 200 micrometers, including all ranges, subranges, and values therebetween. The mold 64 simulates the inside of a glass container such that the molten droplets 60 form a glass substrate 62, taking on the shape of the exterior surface of the mold. It will be appreciated that the mold 64 could have various shapes, sizes, geometries, and configurations to form a number glass products as desired. The molten droplets 60 form the glass substrate 62. The molten droplets 60 can impart a wide variety of desired strengths, structures, textures, colors to form the final glass product.

In another, similar aspect, the molten droplets 60 could be propelled towards and deposited on the surface of a solid glass substrate, such as another glass container or bottle. In this aspect, the molten droplets 60 form a glass coating or exterior layer of the glass container or bottle. Various coatings can be uniformly applied using the methods discussed herein, and strengthen, impart structure, texturize, color, or add and/or modify the pre-existing glass container as desired, forming a dual layer final product.

In one aspect, the molten droplets 60 may be melted and, simultaneously, propelled toward the target surface (e.g., mold 64). Alternatively or additionally, the melting and propelling steps may be carried out sequentially. With the simultaneous method, one of ordinary skill in this art will appreciate that the process may be shortened over the sequential method, saving additional time and cost. It will also be appreciated that the propelling and melting steps can occur on the order of seconds, Which would be unlikely, when compared to conventional glass melting techniques that could take hours to days to achieve a molten glass and require intimate contact between disparate batch components (e.g., sand and soda ash).

Methods of depositing molten materials are referred to as thermal spraying. Thermal spraying is an industrial coating process that consists of a heat source (e.g., flame) and a coating material (e.g., powder) in which the coating material is melted into tiny droplets and sprayed onto a surface at high velocity. Thermal spraying ("spray welding") is known by many names, including plasma spray, HVOF (high velocity oxy-fuel) flame spray, arc spray, flame spray, and metalizing. Additionally, thermal spray processes are divided into four categories: electric arc spray, flame spray, plasma spray, and HVOF flame spray. Flame spray and HVOF utilize oxy-fuel combustion to melt and propel molten droplets toward the target surface. Thermal spraying results in highly Uniform surface coatings. Glass products formed or processed through these various methods can be formed more quickly and efficiently than through conventional glass manufacturing techniques.

Vapor-assisted deposition (VAD) is a technique in which glass-forming precursors, such as $SiCl_4$ and $TiCl_4$, are introduced into a flame in gaseous form and deposited as $SiO_2$ and $TiO_2$ onto the substrate, VAD is different than the thermal spraying methods discussed herein because VAD is generally very slow, taking several hours to build up a glass layer. Further, certain VAD chemicals are in gaseous form, and can be expensive, while the compositions used herein are formed from solids and less costly.

Figure 5A:
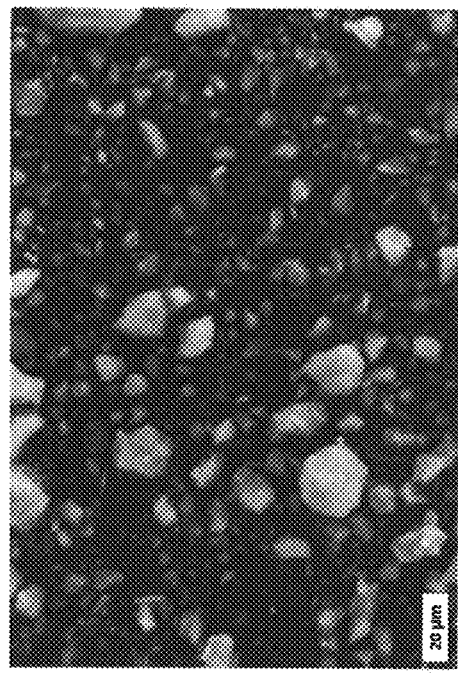
FIGS. 5A-B are photographs of a powder and molten droplets, respectively, formed in accordance with methods of the present disclosure.
Figure 5B:
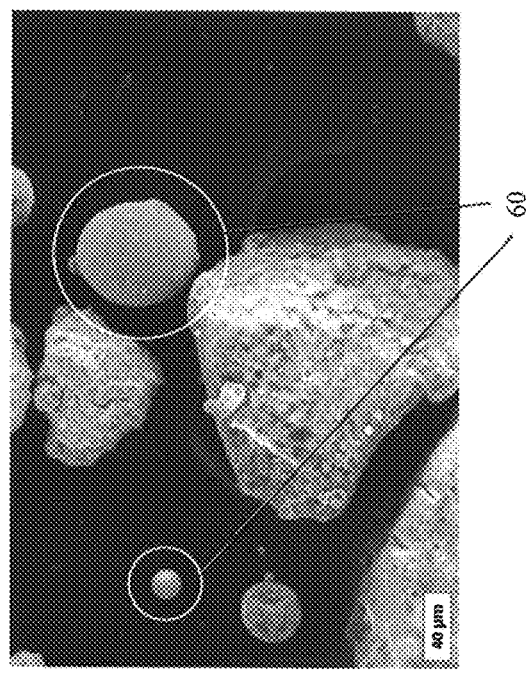

FIGS, 5A-B depict photographs of powder 52 and the molten droplets (e.g., 60) that can be formed using this process. Specifically, FIG. 5A shows the powder 52 prior to flame melting or treatment. Most granules or particles of the powder have a diameter in the range of 1-100 micrometers, including all ranges, subranges, and values therebetween. In FIG. 5B, the powder 52 has been melted into molten droplets (e.g., 60), having a spherical geometry. The formed droplets or beads generally have a diameter in the range of 1-200 micrometers, including all ranges, subranges, and values therebetween.

FIG. 6 is helpful in quantifying the tendency of the SLS glass precursor gel to produce flint glass without the blue/green tint. There, the transmittance profile of three samples of soda-lime-silica glass is depicted: two commercial samples produced from virgin crystalline raw materials and one sample produced from the SLS glass precursor gel. The iron content expressed as wt. % $Fe_2O_3$ (not a metric of the $Fe^{2+}/Fe^{3+}$ ratio) of the two samples produced from crystalline raw materials (samples A and B) and the sample produced from the SLS glass precursor gel (sample C) were measured by x-ray fluorescence and are set forth in table 3 below.

TABLE 3

Iron Content of Samples Expressed as wt. % $Fe_2O_3$

| Sample | Glass Source | wt. % $Fe_2O_3$ |
|---|---|---|
| A | Conventional Crystalline Raw Materials | 0.016 |
| B | Conventional Crystalline Raw Materials | 0.041 |
| C | SLS Precursor Gel | 0.042 |

As shown in the table above and the graph in FIG. 3, the soda-lime-silica glass obtained from the SLS glass precursor gel, which has 0.042 wt. % iron as $Fe_2O_3$, is akin to flint glass derived from conventional crystalline raw materials that has 0.016 wt. % iron as $Fe_2O_3$ in the 600-1200 nm spectral range. The suppression of $Fe^{2+}$ absorption in the glass obtained from the SLS glass precursor gel (sample C), again, is thought to be caused by residual sodium nitrate that is either trapped in the pores of the amorphous oxide-based matrix of the SLS glass precursor gel or chemically bound to the amorphous oxide-based matrix, despite the. repeated separation, rinsing, and drying steps that may be carried out after step 12*c*.

In conjunction with the above description, the glass substrate and/or coating produced may be further processed by traditional glass manufacturing techniques. For example, the formed final product may be cooled in a cooling zone, annealing, conditioned in a conditioning zone, and/or transferred elsewhere. Material handling equipment may remove the glass containers from the forming machines and place the containers on conveyors or the like. Additional coatings may be applied to the various surfaces of the glass substrate and/or coating produced in various areas, such as the neck, interior, and/or exterior. Through an annealing lehr, the temperature may be brought down gradually to a downstream portion, cool end, or exit of the lehr, to a temperature therein, for example, on the order of 65-130° C.

There thus has been disclosed a dried glass precursor gel and methods of forming molten droplets to product various glass substrates and/or coatings. The disclosure has been presented in conjunction with several illustrative embodiments, and additional modifications and variations have been discussed. Other modifications and variations readily will suggest themselves to persons of ordinary skill in the art in view of the forgoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of producing a glass substrate, the method comprising:
providing a silicate solution that includes a dissolved sodium silicate, the dissolved sodium silicate comprising a molar ratio of $Na_2O:SiO_2$;
adding a soluble calcium salt to the silicate solution to displace some of the sodium oxide in the dissolved sodium silicate with calcium oxide and to derive a wet precipitate that comprises a molar ratio of $Na_2O:CaO:SiO_2$;
removing solvent from the wet precipitate;
obtaining a dried glass precursor gel comprising a bulk amorphous oxide-based matrix having an inorganic network of primary constituent oxides, the primary constituent oxides comprising 60 mol % to 85 mol % silica ($SiO_2$), 8 mol % to 18 mol % $Na_2O$, and 5 mol % to 15 mol % CaO;
forming a powder or wire from the dried glass precursor gel;
melting the powder or wire with a gas stream to form molten droplets; and
depositing the molten droplets onto a mold to form the glass substrate.

2. The method of claim 1 wherein the step of obtaining a dried glass precursor gel comprises the dried glass precursor gel having a molar ratio of alkali oxide to the alkaline earth oxide to silica of 0.8:0.8:6 to 1.4:1.3:6.

3. The method of claim 1 wherein the step of obtaining a dried glass precursor gel comprises the dried glass precursor gel having a surface area of at least 20 $m^2/g$.

4. The method of claim 1 wherein the step of obtaining a dried glass precursor gel comprises the dried glass precursor gel being free of pre-melted glass, recycled glass, rock, clay, ore, or ash.

5. The method of claim 1 further comprising:
obtaining a wet glass precursor gel comprising the bulk amorphous oxide-based matrix being homogeneously chemically mixed and having a density of less than 2.0 $g/cm^3$; and
drying the wet glass precursor gel to form the dried glass precursor gel before the step of obtaining a dried glass precursor gel.

6. The method of claim 1 wherein the step of melting the powder or wire includes propelling the molten droplets toward the mold.

7. The method of claim 1 wherein the step of melting the powder or wire comprises using a technique selected from the group consisting of thermal spraying, plasma spraying, high velocity oxy-fuel flame spraying, arc spray, flame spray.

8. The method of claim 1 wherein the step of melting the powder or wire includes the gas stream comprising an oxyacetylene, oxygen-methane, oxygen-natural gas, oxygen-propane, or oxygen-hydrogen flame.

9. The method of claim 1 wherein the step of melting the powder or wire produces substantially no carbon dioxide.

10. The method of claim 1 wherein the step of depositing the molten droplets comprises uniformly depositing the molten droplets onto the mold to form the glass coating.

11. The method of claim 1 further comprising propelling the molten droplets toward the mold after the step of melting the powder or wire and before the step of depositing the molten droplets.

12. A method of forming a glass coating on a solid glass substrate, the method comprising:
providing a silicate solution that includes a dissolved sodium silicate, the dissolved sodium silicate comprising a molar ratio of $Na_2O:SiO_2$;
adding a soluble calcium salt to the silicate solution to displace some of the sodium oxide in the dissolved sodium silicate with calcium oxide and to derive a wet precipitate that comprises a molar ratio of $Na_2O:CaO:SiO_2$;
removing solvent from the wet precipitate;
obtaining a dried glass precursor gel comprising a bulk amorphous oxide-based matrix having an inorganic network of primary constituent oxides, the primary constituent oxides comprising 60 mol % to 85 mol % silica ($SiO_2$), 8 mol % to 18 mol % $Na_2O$, and 5 mol % to 15 mol % CaO, wherein the dried glass precursor gel is not formed with vapor-assisted deposition;
forming a powder or wire from the dried glass precursor gel;
melting the powder or wire with a gas stream to form molten droplets; and
depositing the molten droplets onto the solid glass substrate to form the glass coating.

13. The method of claim 12 wherein the step of obtaining a dried glass precursor gel comprises the dried glass precursor gel having a molar ratio of alkali oxide to the alkaline earth oxide to silica of 0.8:0.8:6 to 1.4:1.3:6.

14. The method of claim 12 wherein the step of obtaining a dried glass precursor gel comprises the dried glass precursor gel having a surface area of at least 20 $m^2/g$.

15. The method of claim 12 wherein the step of obtaining a dried glass precursor gel comprises the dried glass precursor gel being free of pre-melted glass, recycled glass, rock, clay, ore, or ash.

16. The method of claim 12 further comprising:
  obtaining a wet glass precursor gel comprising the bulk amorphous oxide-based matrix being homogeneously chemically mixed and having a density of less than 2.0 g/cm$^3$; and
  drying the wet glass precursor gel to form the dried glass precursor gel before the step of obtaining a dried glass precursor gel.

17. The method of claim 12 wherein the step of melting the powder or wire produces substantially no carbon dioxide.

18. The method of claim 12 wherein the step of depositing the molten droplets comprises uniformly depositing the molten droplets onto the solid glass substrate to form the glass coating.

* * * * *